No. 646,420. Patented Apr. 3, 1900.
J. P. DORAN.
ROTARY ENGINE.
(Application filed Sept. 15, 1899.)

(No Model.) 7 Sheets—Sheet I.

Witnesses. Inventor.
John P. Doran
By Benedict & Morsell
Attorneys

No. 646,420. Patented Apr. 3, 1900.
J. P. DORAN.
ROTARY ENGINE.
(Application filed Sept. 15, 1899.)
(No Model.) 7 Sheets—Sheet 2.

Witnesses: Inventor.
John P. Doran
By Benedict & Morsell
Attorneys.

No. 646,420. Patented Apr. 3, 1900.
J. P. DORAN.
ROTARY ENGINE.
(Application filed Sept. 15, 1899.)
(No Model.) 7 Sheets—Sheet 3.

Witnesses. Inventor.
John P. Doran
By Benedict & Morsell
Attorneys.

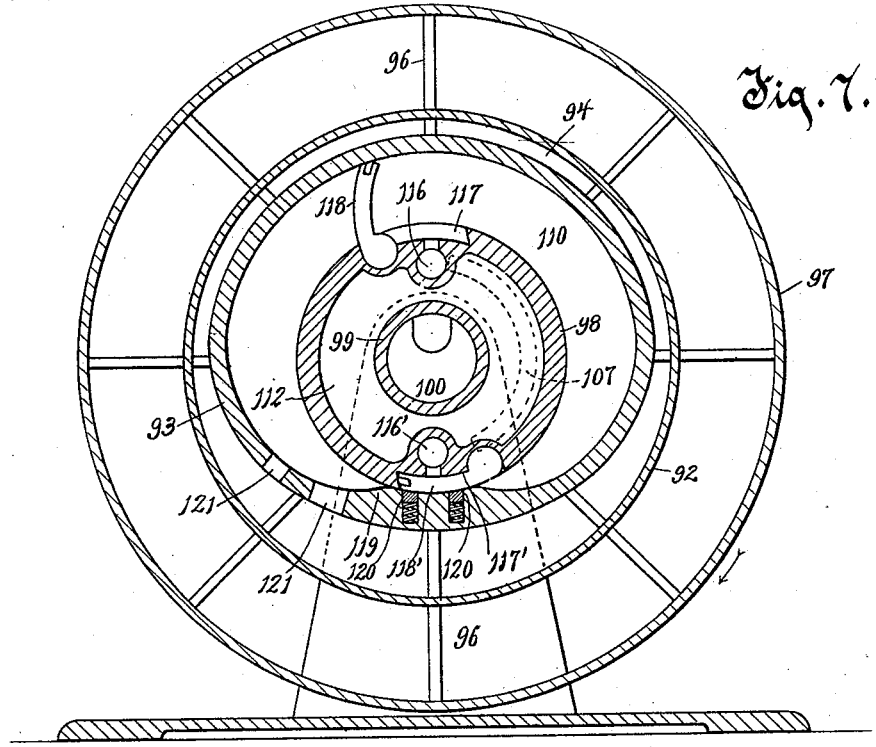

No. 646,420. Patented Apr. 3, 1900.
J. P. DORAN.
ROTARY ENGINE.
(Application filed Sept. 15, 1899.)
(No Model.) 7 Sheets—Sheet 5.

Witnesses.
O. H. Keeney.
Anna V. Faust.

Inventor.
John P. Doran.
By Benedict & Morsell
Attorneys.

No. 646,420. Patented Apr. 3, 1900.
J. P. DORAN.
ROTARY ENGINE.
(Application filed Sept. 15, 1899.)
(No Model.) 7 Sheets—Sheet 6.
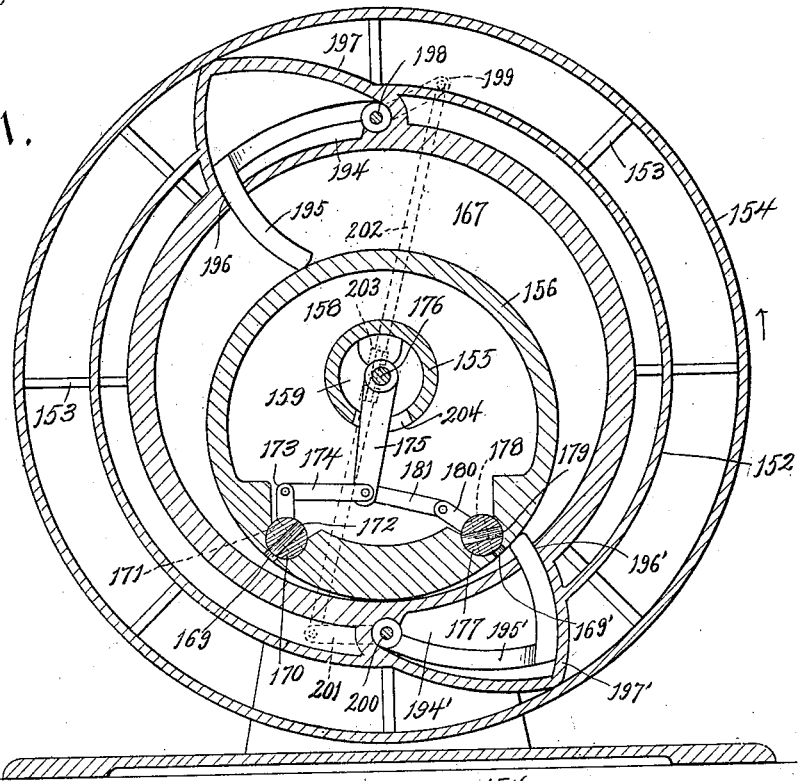
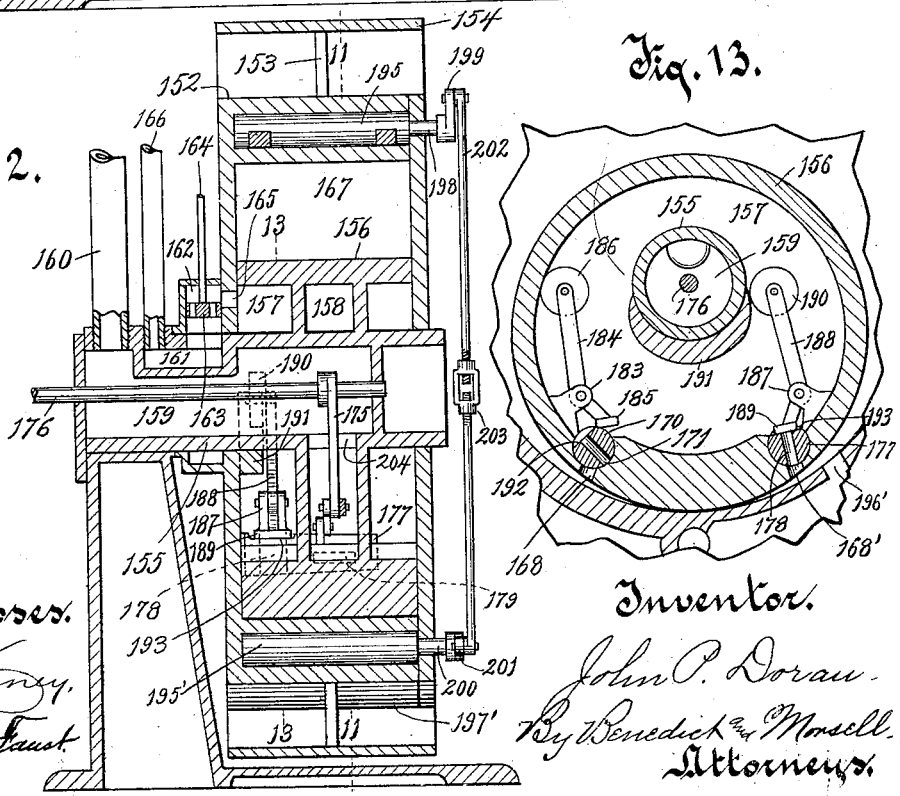
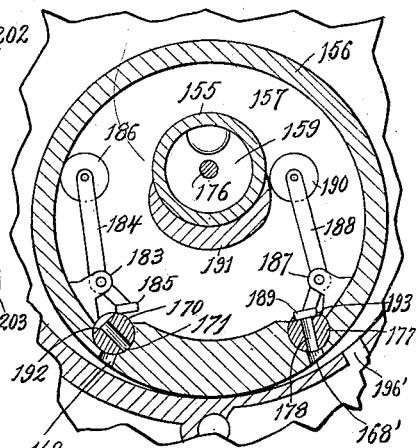
Witnesses.
Inventor.
John P. Doran.
By Benedict & Morsell
Attorneys.
THE NORRIS PETERS CO., PHOTO-LITHO., WASHINGTON, D. C.

No. 646,420. Patented Apr. 3, 1900.
J. P. DORAN.
ROTARY ENGINE.
(Application filed Sept. 15, 1899.)

(No Model.) 7 Sheets—Sheet 7.

Witnesses.

Inventor.
John P. Doran.
By Benedict & Morsell
Attorneys.

UNITED STATES PATENT OFFICE.

JOHN P. DORAN, OF LARK, WISCONSIN.

ROTARY ENGINE.

SPECIFICATION forming part of Letters Patent No. 646,420, dated April 3, 1900.

Application filed September 15, 1899. Serial No. 730,533. (No model.)

*To all whom it may concern:*

Be it known that I, JOHN P. DORAN, of Lark, in the county of Brown and State of Wisconsin, have invented a new and useful Improvement in Rotary Engines, of which the following is a description, reference being had to the accompanying drawings, which are a part of this specification.

My invention has relation to improvements in rotary engines.

The primary object of the invention is to provide an improved construction of rotary engine whereby the greatest percentage of power is obtainable from a minimum amount of steam, while simplicity and durability of construction with a minimum of friction are attained.

With the above primary object in view the invention consists of the devices and parts or their equivalents, as more fully set forth.

Figure 1:
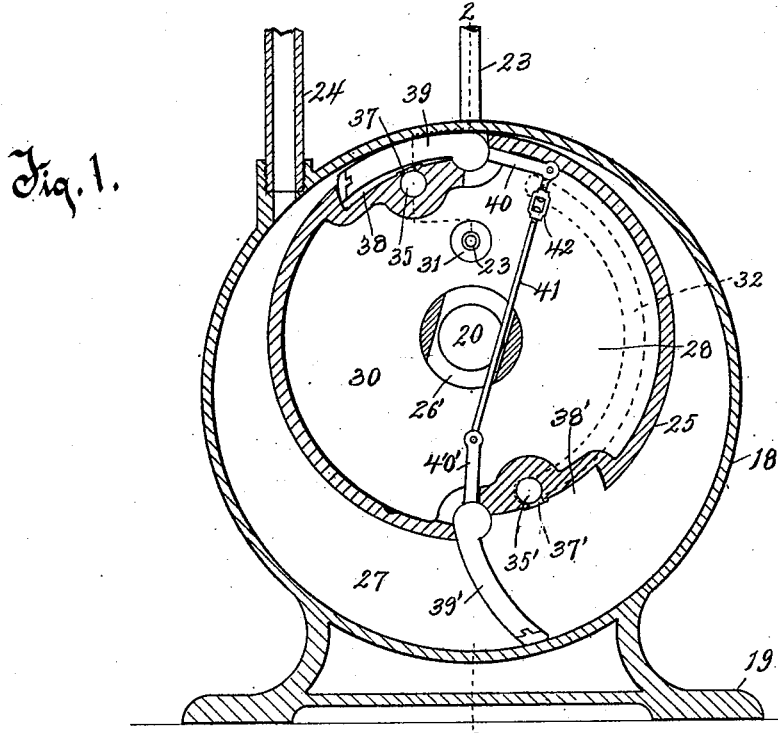
Figure 2:
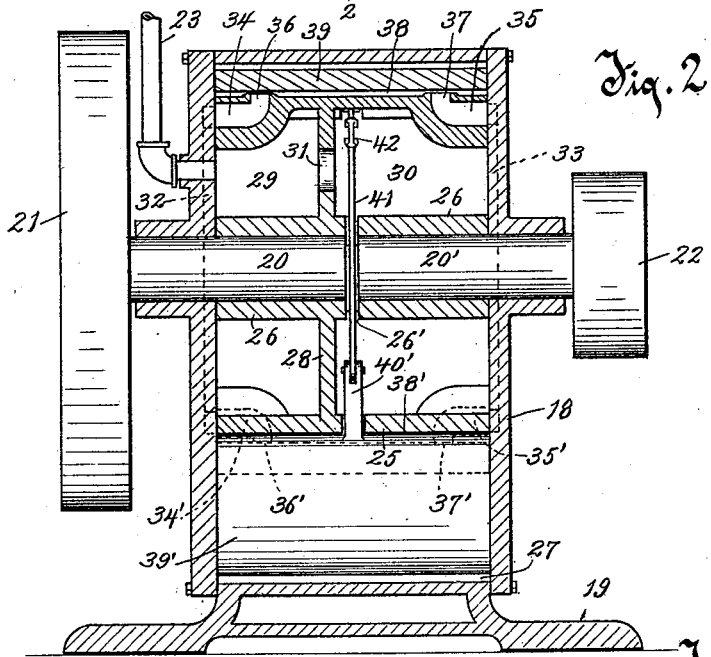
Figure 3:
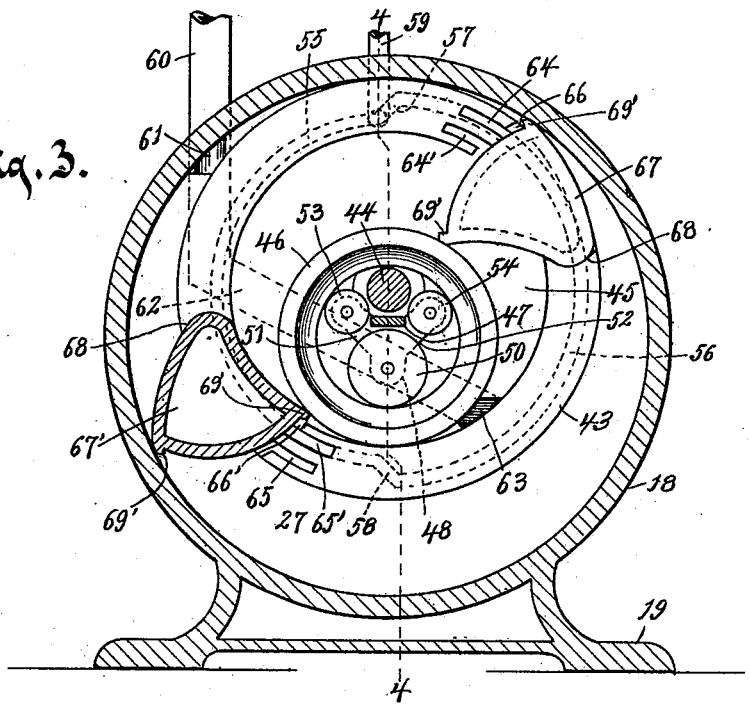
Figure 4:
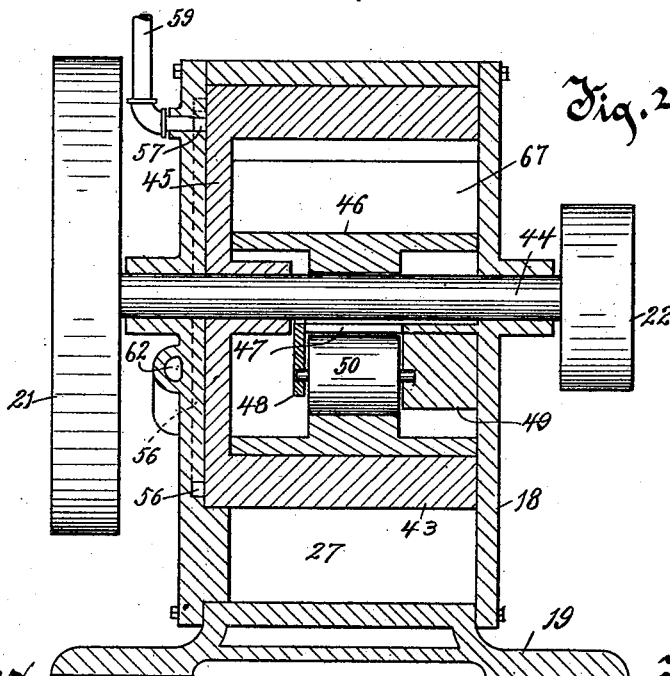
Figure 5:
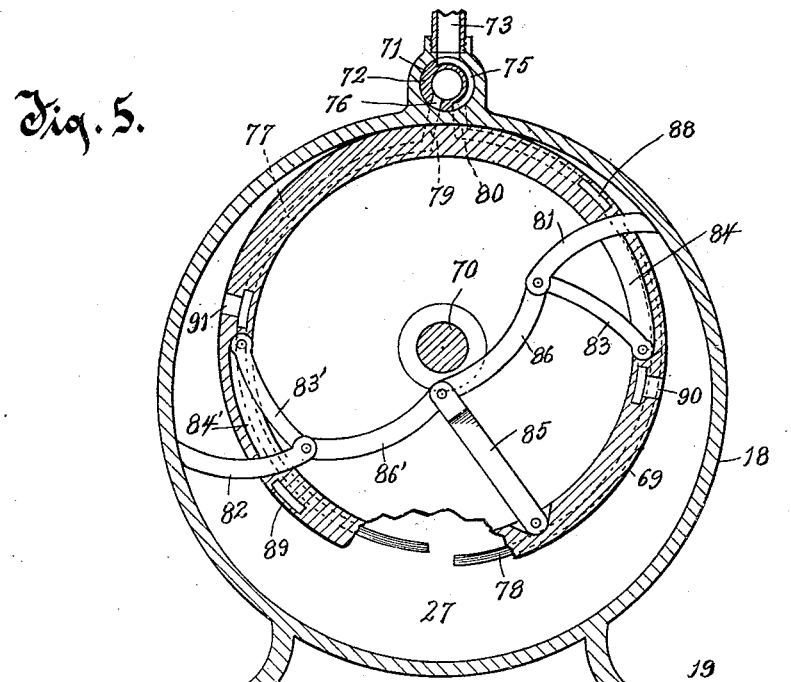
Figure 6:
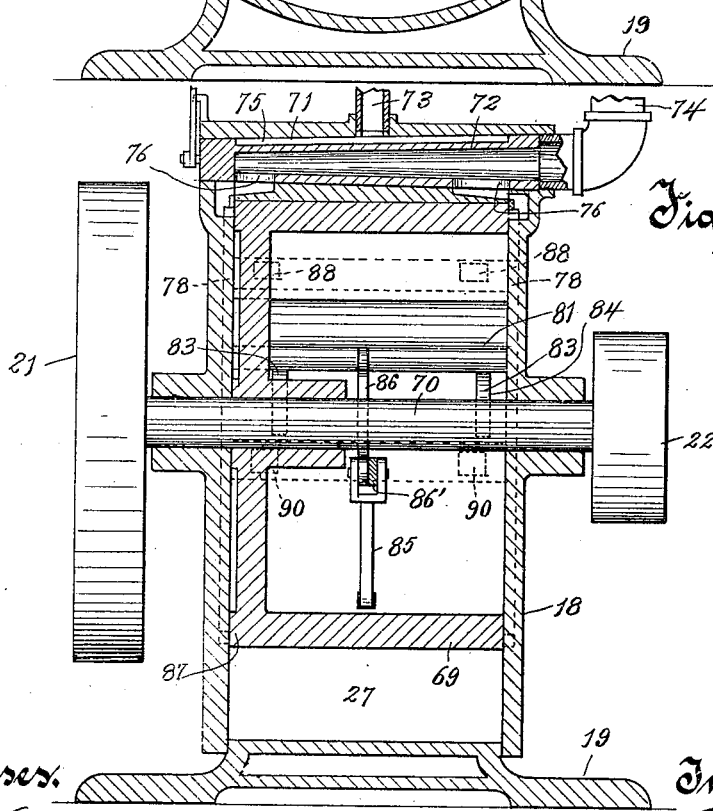
Figure 9:
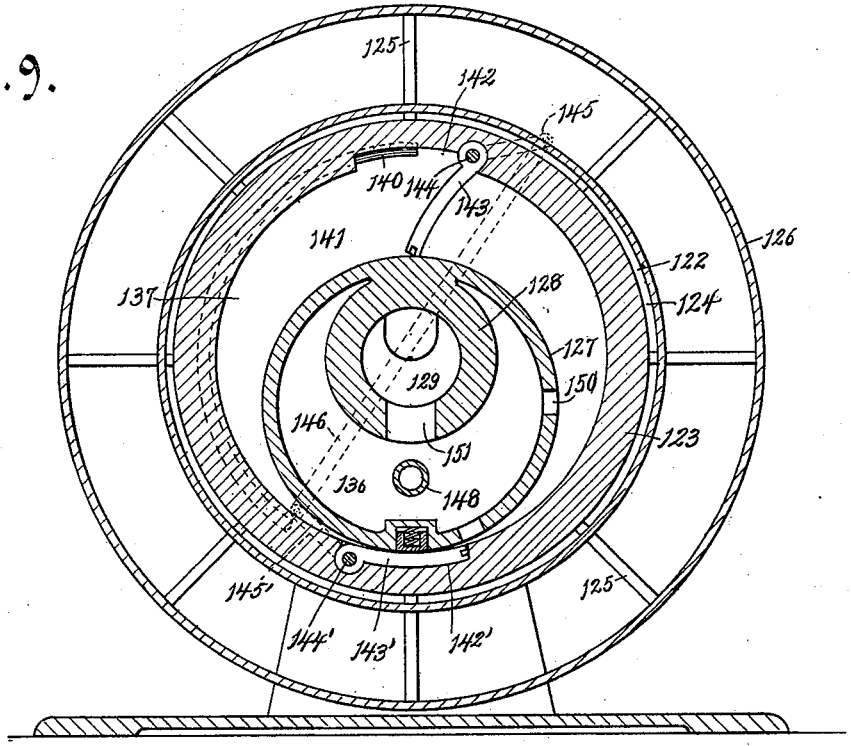
Figure 10:
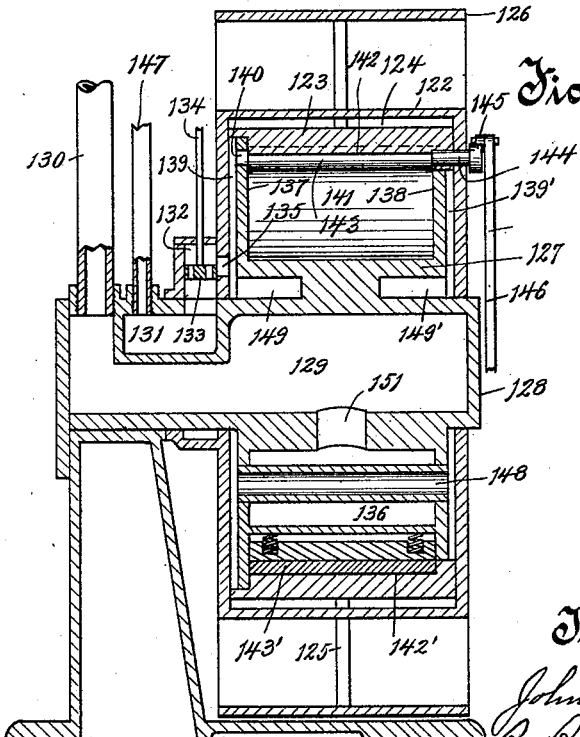
Figure 14:
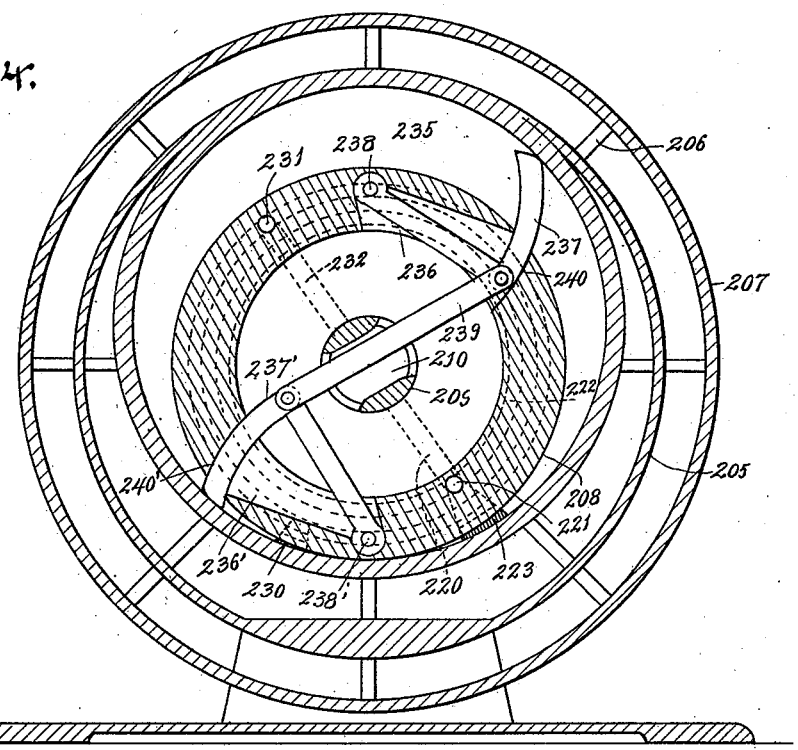
Figure 17:
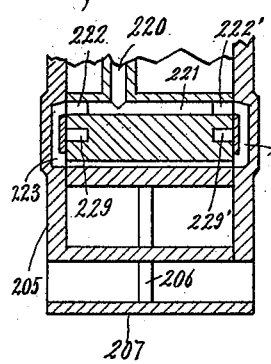
Figure 15:
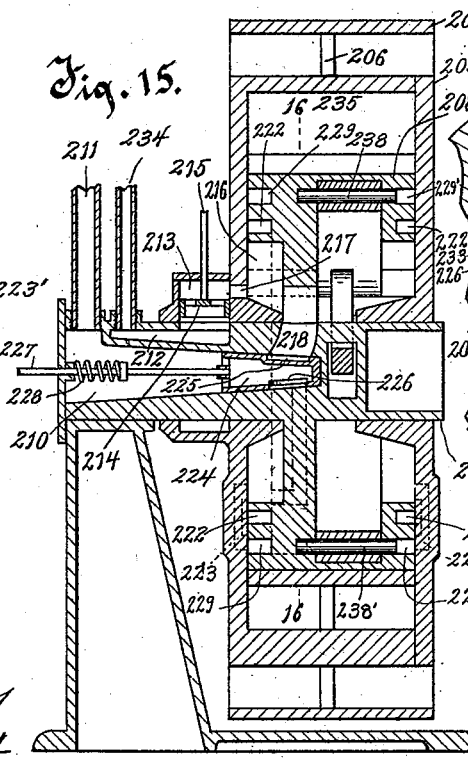
Figure 16:
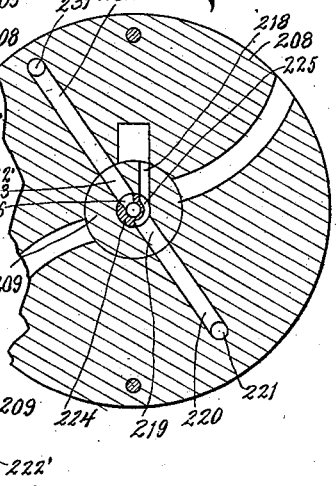

In the accompanying drawings, Figure 1 is a vertical sectional view of one embodiment of the invention. Fig. 2 is a cross-section on the line 2 2 of Fig. 1. Fig. 3 is a vertical sectional view of a modified form of the engine. Fig. 4 is a section on the line 4 4 of Fig. 3. Fig. 5 is a vertical section of a modified form of construction. Fig. 6 is a central transverse section of Fig. 5. Fig. 7 is a vertical section of a modified form of construction. Fig. 8 is a central transverse section of Fig. 7. Fig. 9 is a vertical sectional view of a modified form of construction. Fig. 10 is a transverse central section of Fig. 9. Fig. 11 is a vertical section taken on the line 11 11 of Fig. 12. Fig. 12 is a central transverse section of Fig. 11. Fig. 13 is a section on the line 13 13 of Fig. 12. Fig. 14 is a central vertical section of a modified form of construction. Fig. 15 is a transverse central section of Fig. 14. Fig. 16 is a section on the line 16 16 of Fig. 15, and Fig. 17 is a detail section through one of the ports of this form of engine.

Referring to the form of engine illustrated on Sheet 1 of the drawings, the numeral 18 indicates a circular casing mounted upon a suitable base 19. Journaled in the sides of this casing is a two-part shaft 20 20', the outer end of the section 20 of the shaft carrying a fly-wheel 21, and the outer end of the section 20' carrying a belt-pulley 22, around which a belt (not shown) is adapted to be passed for the purpose of transmitting the power to the machinery to be driven. Extending through one of the side pieces of the casing is an inlet-pipe 23, and extending from the circular rim of the casing is an outlet or exhaust pipe 24. Mounted upon the two-part shaft 20 20' is a piston 25, said piston being provided with a hub 26, which fits around the two-part shaft. This hub is provided with a recess 26', which is in line with the space between the two sections of the shaft. This hub is tightly fitted to the shaft-sections, so as to rotate therewith. It will be noticed that the piston is mounted eccentrically in the casing, and the space between the piston and the casing forms a chamber 27. The piston is hollow and is in the form of an open-ended cylinder, the end edges fitting against the inner sides of the side pieces of the casing. The interior of the piston is subdivided by means of a wall 28 into two annular chambers, (indicated, respectively, by the numerals 29 and 30,) the wall 28 having an opening or port 31 therethrough which puts the two chambers into communication. The inlet-pipe 23 may lead through either side piece of the casing, so as to discharge into either the chamber 29 or 30. In the accompanying illustrations it is shown as capable of discharging into the chamber 29. The inner side of each side piece of the casing is shown as provided with a curved segmental recess. The recess of one side piece is indicated by the numeral 32 and the recess of the other side piece by the numeral 33. At each end of the piston said piston is provided at diametrically-opposite points with two eduction-passages, the two passages on the left-hand end of the piston, Fig. 2, being indicated by the numerals 34 34', respectively, and the two passages on the right-hand side of Fig. 2 by the numerals 35 35', respectively, said several passages extending laterally through the rim of the piston. The inner ends of these passages communicate with ports extending through the rim of the piston and leading to the chamber 27. The ports of the passages 34 34' are indicated, respectively, by the numerals 36 36' and the ports of the passages 35 35' by the numerals 37 37', respectively. It will be evident that at certain periods of the rotation of the piston two of the passages of each set are brought into register with the recesses 32 and 33, and consequently the steam which may have passed into said recesses is free to pass into the eduction-passages, and thence out through the ports thereof into the chamber 27, and out of this chamber it is conducted by way of the discharge-pipe 24. At diametrically-opposite points the piston is provided with recesses 38 38', and in these recesses are fitted steam-gates 39 39', respectively. Each gate is pivoted or hinged at one end in its recess, and its opposite end is free at certain times to swing outwardly in contact with the rim of the casing 18. The hinged end of the gate 39 is provided with a projecting arm 40, extending inwardly through an opening therefor in the piston, and the gate 39' is provided with a similar arm 40', extending through an opening therefor in the piston. The inner extremities of these arms are connected by a link 41. Said link, if desired, may be separated in its length and the separated ends connected by means of a turnbuckle 42, whereby a means for adjustment of the link is provided. The link, as will clearly appear from the drawings, fits in the space between the inner ends of the two-part shaft 20 20' and the recess 26' of the hub 26. Referring to the operation of this form of the engine, the inlet steam is free to pass through the pipe 23 and thence enter and fill the chamber 29 and also fill the chamber 30 as well as the recesses 32 and 33. In the rotation of the piston the passages 34 and 35 and 34' and 35' are alternately brought into register with these recesses 32 and 33, and as long as they are in register with said recesses steam is free to pass from the recesses through the passages and through the ports leading from said passages into the chamber 27. In Fig. 1 the gate 39 is shown as forced inwardly in its recess by the action of the rim of the casing thereon, while the gate 39' is swung outwardly, so that its free edge is in contact with the rim of the casing. This gate 39' commenced to swing outwardly when the passages 34' and 35' first registered with the recesses 32 and 33. When this registration occurred, the steam passed through the passages 34' and 35', thence through the ports 36' and 37', and commenced to act on the gate 39' to swing it outwardly, and as the piston was rotated by the action of the steam against the gate 39' said gate was gradually carried around to the widest space between the piston and casing, so as to permit of the gate fully coming out, and with this gradual swinging out of the gate 39' the link 41 is necessarily acted upon, so as to gradually permit of the closing of the gate 39 by the action of this link and also by the action of the rim of the casing on said gate 39. In Fig. 1 the passage 35' is shown as having just reached the lower end of the recess 33, and the moment this passage fully passes said recess the flow of steam through said passage against the gate 39' is stopped, and hence the piston is rotated by the expansive power of the steam already back of the gate 39' acting against said gate until the piston is rotated sufficiently far to bring the passages 34 and 35 into register with the recesses 32 and 33.

While I have shown in the Sheet 1 form of construction the two recesses 32 and 33 and the two sets of passages 34 34' and 35 35', it will be obvious that only one recess need be employed and but one set of passages provided and successful results obtained.

In the form of construction illustrated on Sheet 2 of the drawings the casing is designated by the numeral 18, the supporting-base thereof by the numeral 19, and the chamber between the piston and the casing by the numeral 27, the same as in the Sheet 1 form of construction.

The piston of the Sheet 2 form of construction is indicated by the numeral 43. This piston is eccentrically mounted within the casing on a transverse shaft 44 and is rotatable with said shaft. One portion of the piston owing to its eccentricity is always in contact with the rim of the casing. The shaft 44 carries on one end the fly-wheel 21 and upon its opposite end the belt-pulley 22. The piston is advisably of cylindrical form, and one end thereof is closed by the side piece 45, while the opposite end thereof is open. Within the bore of the hollow piston is a roller 46, which is eccentrically and loosely mounted on the shaft 44. The periphery of this roller touches the interior of the piston. Extending from one of the side pieces of the casing is a beam 47, and this beam is provided at its inner end with a depending arm 48. In this arm and in a block 49, extending from the side piece of the casing, is journaled the shaft or axis of a roller 50, which roller bears against the interior of the roller 46. The beam 47 is also provided with two upwardly-extending diagonal arms 51 and 52, and in these arms and in the stationary framework are mounted the journals of small rollers 53 and 54, respectively, said rollers also bearing against the interior of the roller 46. The inner side of one of the side pieces of the casing is provided therearound with an annular recess, substantially one half of said recess describing a circle of less circumference than the other half thereof. The portion of the recess which describes the less circle is indicated by the numeral 55 and the portion which describes the greater circle by the numeral 56. These two portions of the recess are joined by short diagonal recesses 57 and 58, respectively.

The numeral 59 indicates the inlet-pipe, which extends through one side of the casing and communicates with one end of the short diagonal recess 57. The discharge or outlet pipe is indicated by the numeral 60. This pipe, immediately below the inner side of the rim of the casing, is provided with an opening 61, which communicates with the chamber 27. This pipe is continued downwardly in the chamber 27 for a desired distance below the opening 61 and is provided with a downwardly-extending extension 62, the extremity of said extension communicating with the interior of the piston through the port 63.

At diametrically-opposite points the piston is provided with sets of ports which form a communication between the chamber 27 and the interior of the piston. The two ports of one set are indicated by the numerals 64 64' and the two ports of the other set by the numerals 65 65'. The ports 64 and 65 of the respective sets are in line with the recessed portion 56 of the casing, and the ports 64' and 65' of the respective sets are in communication with the recessed portion 55 of the casing.

At diametrically-opposite points the piston is provided through its rim with openings 66 and 66', respectively, and through these openings are adapted to work swinging gates 67 and 67', respectively, said gates being, preferably, hollow in form. One angle or corner of each of these gates is rounded, and this rounded portion fits and turns in a rounded recess 68.

In the operation of the Sheet 2 form of construction the inlet steam is free to pass into and fill the recessed portions 55 56 of the casing, but is prevented from passing directly into the chamber 27 by reason of the fact that the side piece 45 of the piston bears against the inner side of the side piece of the casing, which is provided with said recessed portions. Inasmuch as either the port 64 or 65 is in register with the recessed portion 56 and either the port 64' or 65' is in register with the recessed portion 55 the inlet steam is free to pass from said recessed portions into the interior of the piston. In Fig. 3 I show the piston at such position that the port 64 is in register with the recessed portion 56 and the port 65' in register with the recessed portion 55. The inlet steam therefore passes through the ports 64 and 65' into the interior of the piston and there acts against the swinging gates 67 and 67', causing said gates to swing outwardly through the openings 66 and 66' and to bear against the interior of the rim of the casing. It will be noticed that the bearing-corners of these gates are provided with shoulders 69', the interior shoulder of each bearing against the roller 46 and the outer shoulder against the inner side of the rim of the casing. The steam acting against these gates causes the piston to rotate, and as each gate is brought around into the gradually-widened space between the piston and the casing the gate gradually turns outwardly a greater extent. In Fig. 3 the gate 67 is shown as forced outwardly but a slight distance, while the gate 67', which is in a wider portion of the space, is turned outwardly a considerable distance. It will be seen that by the construction described a continuous rotation is given to the piston. When the piston has been rotated sufficiently far, the port 64, which is shown in Fig. 3 as in register with the recessed portion 56, will be brought out of register therewith, and the port 64' will be brought into register with the recessed portion 55, while the port 65 will at a certain period of the rotation of the piston be brought into register with the recessed portion 56. When port 64 is brought out of register with recess 56, steam will act expansively on gate 67 in chamber 27, and this is also true of gate 67'. When ports 64' and 65' are out of register with recess 55, steam will act expansively on gates 67 and 67' in the chamber of the piston. The steam is exhausted from the interior of the piston through the port 63, thence into the extension 62, and finally out of the outlet-pipe 60, and the steam is exhausted from the chamber 27 through the opening 61 into the discharge-pipe 60. The friction is reduced to the minimum in the rotation of the piston by reason of the provision of the rollers 46, 50, 53, and 54, the roller 46 bearing revolubly against the interior of the piston and the rollers 50, 53, and 54 bearing revolubly against the interior of said roller 46.

In the Sheet 3 form of construction the casing is indicated by the numeral 18, the supporting-base of the casing by the numeral 19, and the chamber between the piston and the casing by the numeral 27, the same as in the preceding forms of construction. The piston of this form of construction is indicated by the numeral 69 and the shaft with which said piston rotates by the numeral 70. The piston is mounted eccentrically on this shaft, as in the other forms of construction, so that one portion of the piston is always in bearing contact with a portion of the rim of the casing. The upper portion of the casing is formed with a valve-chamber 71, in which is fitted a tapering hollow valve 72. An inlet-pipe 73 communicates with the valve-chamber, and an outlet-pipe 74 communicates with one end of the valve 72. The valve is formed with a semicircular recessed portion 75 and has also extending therethrough and leading to its interior ports or openings 76. On the inner side of each side piece of the casing are two segmental recesses 77 and 78, respectively, the recess 78 describing a greater arc than the recess 77. At one end the recesses 77 communicate with passages 79, which lead to the valve-chamber 71, and corresponding ends of the recesses 78 communicate with passages 80, also leading to the valve-chamber 71. The other ends or extremities of the recesses do not meet, as clearly disclosed by the broken-away portion of Fig. 5. One of the steam-actuated gates is indicated by the numeral 81 and the other gate by the numeral 82. These gates extend through openings therefor in the piston, and the inner edges of said gates have extending rigidly therefrom arms, (designated, respectively, by the numerals 83 and 83',) making said gates substantially of the form of bell-cranks. The arms 83 and 83' are adapted to be received, respectively, in recesses 84 84', provided therefor in the inner side of the rim of the piston, and their outer ends are pivoted in the recesses at one end of each recess. Pivoted at its outer end to the inner side of the rim of the piston is an arm 85, and to the inner end of this arm are pivoted the inner ends of links 86 86', respectively, the outer ends of said links being pivotally joined, respectively, to the gates at the angles of the gates and the arms 83 and 83'. The piston is advisably in the form of a hollow cylinder, with one end closed and the other end open. At the closed end of the piston the rim is projected out laterally, as indicated by the numeral 87, and this lateral projection is wide enough to cover the width of the recesses 77 and 78. The edge of the rim of the piston at the open side of said piston is wide enough to cover the recesses 77 and 78 on that side of the engine. The outer side of the rim of the piston is provided with two sets of inlet-ports, (designated, respectively, by the numerals 88 88 and 89 89.) These inlet-ports 88 and 89 are in line to establish communication between the recesses 78 and the chamber 27. Said outer surface of the piston is also provided with two sets of exhaust-ports, (designated, respectively, by the numerals 90 90 and 91 91.) These exhaust-ports are in line to establish communication between the chamber 27 and the recesses 77. Mounted on one end of the shaft 70 is the fly-wheel 21 and on the opposite end of said shaft the belt-pulley 22. The operation of this form of engine will now be explained. In the position of the valve 72 shown in Fig. 5 the segmental recess 75 of said valve is in register with the passages 80 and the ports 76 of said valve in register with the passages 77. The inlet steam is therefore free to pass from the inlet-pipe 73 around the recess 75 of the valve, and thence into the recesses 78. From the recesses 78 it passes through the inlet-ports 88 into the chamber 27 and acts against the gate 81, thus causing a rotation of the piston. As the piston rotates and the gate 81 is brought into the widened portion of the chamber 27 said gate will turn outwardly, so as to gradually bring its full surface to the action of the steam. As soon as the piston has been rotated sufficiently far to bring the exhaust-ports 90 into register with the recesses 77 the steam is exhausted through said ports 90 into the recesses 77, thence by said recesses to the passages 79 through the port 76, thence through the tubular valve, and out of the exhaust-pipe 74. In Fig. 5 of the drawings the exhaust-ports 91 are shown in alinement with the passages 77, and hence the steam in advance of the gate 82 is exhausting therethrough. As one of the gates—for instance, the gate 81—is gradually working outward to its full extent the opposite gate is being turned inwardly by the link connections 86 and 86', and, vice versa, when the gate 82 is being turned outwardly the opposite gate is being turned inwardly.

Sheet 4 illustrates a form of construction wherein the piston is stationary and the outer casing rotatable. Referring to this form of construction, the numeral 92 indicates the outer casing, which is preferably of cylindrical form and is provided with an interior wall 93, which forms a chamber 94 around the casing, said chamber being in communication with another chamber 95 on one side of the casing. The outer casing is in the form of a wheel, having spokes 96 radiating therefrom and to an outer rim 97, around which a belt (not shown) is adapted to be passed for the purpose of transmitting the power. The piston of this form of construction is indicated by the numeral 98 and is advisably of cylindrical form. It is mounted rigidly on or forms an integral part of a stationary shaft 99, said shaft being hollow, so as to form a passage 100 therein. The shaft is also formed with a chamber 101, to which an inlet-pipe 102 leads, and an exhaust-pipe 103 extends from the passage 100. The chamber 101 of the shaft communicates with a valve-chamber 104, said valve-chamber having mounted therein a valve 105, having an opening or a series of openings therethrough. Extending from the valve and through the top of the valve-chamber is a valve-rod 106. The inner sides of the rotatable casing are provided each with a segmental recess. The segmental recess on one side is indicated by the numeral 107 and the segmental recess on the opposite side by the numeral 108. The segmental recess 107 is open at one end to the valve-chamber 104 by means of a port 109. These segmental recesses are bridged over by the opposite ends of the piston, so as to prevent under ordinary conditions the steam passing into the chamber 110, which surrounds the rim of the piston. The piston, however, is provided with two annular chambers 111 and 112, separated by a wall 113, said chambers being in communication with each other by means of an opening 114 through the wall 113. The chamber 111 is in communication with the recess 107, and the chamber 112 is in communication with the recess 108. At one end the piston is provided with passages 115 115', and at its opposite end said piston is provided with similar passages 116 116'. The passages 115 115' are adapted to be alternately brought into register with the recess 107, and the passages 116 116' are adapted to be brought alternately into register with the recess 108. These passages 115 115' and 116 116' communicate with the chamber 110. At diametrically-opposite points the piston is provided with recesses 117 117'. In these recesses are fitted and hinged gates 118 118'. The gate 118 is located so as to seat itself over passages 115 116, and the gate 118' is so located as to seat itself over the passages 115' and 116'. The wall 93 is provided with an inwardly-extending portion, which forms a cam 119. In this cam are preferably located spring-actuated packing-strips 120 120, which are adapted to bear against a gate and prevent the steam from passing from one portion of the chamber 110 to the other. In the operation of this form of the engine the inlet-steam passes through the pipe 102, thence into chamber 101, thence through the openings of the valve 105, thence through port 109, and from which port it enters the recess 107. From the recess the steam flows into and around the chamber 111, thence through the opening 114 into and around the chamber 112, and thence into the recess 108. As the casing revolves the recess 107 is brought into alinement with the passages 115 115' and the recess 108 also into alinement with the passages 116 116'. The steam therefore will pass through one of these passages and act against the particular gate to force the same outwardly, and the pressure of the steam against said outwardly-forced gate will continue the rotation of the casing, the inlet-steam filling up the space between the particular gate so actuated and the cam 119. In Fig. 7 of the drawings the gate 118 is shown as forced outwardly, and the gate 118' is shown as forced inwardly by the action of the cam 119 thereagainst. The steam in advance of the gate 118' is free to pass through openings 121 121 in the wall 93, thence into the chamber 94, and thence to the chamber 95, thence through the longitudinal passage 100 of the shaft, and, finally, out through the exhaust-pipe 103. The exhaust-steam thus filling the chambers 94 and 95 produces a flow of steam all around the casing and on one side of the piston, so that said piston is maintained in a heated condition.

If the speed of the engine at any time becomes too great, governor mechanism similar to that described in my pending application for patent for improvements in rotary engines, filed May 1, 1899, Serial No. 715,152, is adapted to act on the valve-rod 106 and move the valve so as to either partially or entirely close off the port 109, and hence prevent the passage of the steam to the chamber 110 until the speed of the engine is reduced, when the valve will automatically resume its position illustrated in Fig. 8 and permit the inlet-steam to again pass into the chamber 110.

In the modified form of construction illustrated on Sheet 5 the interior piston is stationary and the casing is the revolving part. The casing is made up of two annular rims 122 and 123, respectively, with a space therebetween forming an annular chamber 124. These rims are connected by side pieces. Spokes 125 radiate from the casing and extend to and connect with an outer rim 126. The piston is indicated by the numeral 127, and this piston is mounted rigidly on or forms an integral part of a stationary shaft 128, said shaft being tubular in order to provide a longitudinal exhaust-passage 129, from which exhaust-passage leads an exhaust-pipe 130. The shaft is also formed with a chamber 131, which chamber is in communication with a valve-chamber 132. In this valve-chamber is arranged a valve 133, said valve having one or more openings therethrough. The valve is provided with a valve-rod 134, which extends through the top of the valve-chamber. The valve-chamber has extending therefrom and through one of the side walls of the casing a port or opening 135. The piston hereinbefore referred to abuts at one portion against the inner wall 123 of the casing, and there is considerable space between the interior of the tubular piston and its shaft, so as to form a chamber 136. The piston has also extending therefrom annular side walls 137 and 138, respectively, slight spaces being left between said side walls and the side walls of the casing to thereby form chambers 139 and 139'. To the chamber 139 leads the port 135. The side wall 137 of the piston is provided with a segmental slot or steam-passage 140, which extends entirely through said side wall, and thereby puts the space 141 between the side walls 137 138 into communication with the chamber 139. The inner rim 123 of the casing fits between the side walls 137 and 138 of the piston and extends far enough in between said side walls as to close the segmental slot 140. This inwardly-extending portion of the rim 123 is recessed at diametrically-opposite points, as indicated by the numerals 142 142'. In these recesses are adapted to be seated and hinged steam-actuated gates 143 143'. These gates are mounted on rods 144 144', which at one end extend out beyond one side piece of the casing and are provided with arms or cranks 145 145', respectively, said arms or cranks being connected by a link 146. In Fig. 9 this link is shown in dotted lines. It will be understood, however, that the section on which Fig. 9 is taken the link 146 would be on the outside of the side piece of the casing, which is removed. I have only illustrated the link by dotted lines, however, so as to clearly show how the two arms or cranks are connected thereto. To the chamber 131 leads the steam-inlet pipe 147. In the operation of this form of the engine inlet-steam is free to flow through the pipe 147, thence into chamber 131, thence into valve-chamber 132, thence through the openings of the valve, and thence through the port 135, thence into the chamber 139, and from said chamber 139 to chamber 139' through the medium of a pipe 148, which extends across the chamber 136 of the piston and puts these two chambers 139 and 139' into communication. The steam in the chambers 139 and 139' is also free to pass into other chambers 149 and 149', which are formed in the piston, but which are entirely closed off from the chamber 136 of the piston. It will be understood that the gate-recesses 142 and 142' are formed in the portion of the rim 123 which extends between the side walls 137 and 138, and consequently these cut-out portions which form these recesses will expose the segmental slot at one or the other end thereof. In Fig. 9 I have shown the upper end of said slot as exposed, the steam of course being free to pass from the chamber 139 through this exposed end of the slot 140, and thence act against the gate 143 and force it inwardly into contact with the piston, as clearly shown in Fig. 9. When this gate is thus forced inwardly, the rod 144 is turned, and consequently the rod 146 is so actuated as to act on the rod 144' and maintain the gate 143' in a closed position. When the gate 143 is forced inwardly, as described, steam is admitted into the space or chamber 141, and this steam, acting against the gate 143 and against the portion of the piston which abuts against the rim 123, will cause the casing to be rotated, and as the gate 143 is gradually carried around into the narrowing portion of the space 141 it is thereby being gradually closed, while the gate 143' is being gradually opened, the recess 142' at the same time being gradually brought into communication with the segmental slot 140, so as to take the inlet-steam. The exhaust-steam in advance of a gate is free to pass from the space 141 through a port 150 in the piston into the chamber 136 of the piston, thence from said chamber 136 through a port 151 in the shaft 128, and along the longitudinal exhaust-passage 129 of said shaft to the exhaust-pipe 130.

The form illustrated on Sheet 6 is also a form wherein the inner piston is stationary and the surrounding casing rotatable. The numeral 152 indicates the outer casing, which is provided with the radiating spokes 153, connected at their outer ends to the outer rim 154. The numeral 155 indicates the stationary shaft, upon which is mounted the piston 156, said piston being mounted fast on the shaft or integral therewith. The piston is provided with two steam-chambers, (indicated, respectively, by the numerals 157 and 158.) The shaft is provided with a longitudinal passage 159, and connected to the outer end of this passage is a pipe 160. The shaft is also provided with a chamber 161, which communicates with a valve-chamber 162, said valve-chamber having a valve 163 therein. The valve is provided with one or more openings, and has also extending from its upper surface a valve-rod 164, which extends through the top of the valve-chamber. The valve-chamber is in communication with the chamber 157 of the piston by means of a port or opening 165. A pipe 166 extends to the chamber 161. The chamber confined between the piston and the casing is indicated by the numeral 167. The chamber 157 of the piston has two passages 168 168', respectively, leading to the chamber 167. The chamber 158 of the piston is also provided with two passages 169 169', leading to the chamber 167. A rotatable valve 170 is adapted for controlling the passages 168 and 169, said valve extending through the wall separating the two chambers and being seated in recesses provided therefor. This valve is provided with one duct 171 for controlling the passage 168 and with another duct 172 at right angles to the duct 171 for controlling the passage 169. Extending from the valve is an arm 173, and to this arm is jointed a link 174, said link connected with another arm 175, extending downwardly from a rod 176, which rod extends longitudinally through the longitudinal chamber 159 of the shaft 155 and is extended at one end beyond the end of said shaft and is provided on said extended end with a crank or handle (not shown) for convenience in turning the same. Another rotatable valve 177 is adapted for controlling the passages 168' and 169', said valve extending through the wall which separates the two chambers 157 and 158 and being seated in recesses provided therefor. This valve is also provided with two ducts arranged at right angles to each other, one being designated by the numeral 178 and the other by the numeral 179. The duct 178 controls the passage 168', and the duct 179 controls the passage 169'. Valve 177 has also extending therefrom an arm 180, and to this arm is connected a link 181, said link in turn being jointed to the arm 175, extending from rod 176. Projecting into the chamber 157 is a lug 183, and to this lug is pivoted a lever 184, the short arm of said lever being provided with a foot portion 185 and the extremity of the long arm of said lever with an antifriction-roller 186. Also projecting into this chamber 157 is a similar lug 187, and to this lug is pivoted a lever 188, the short arm of said lever being provided with a foot portion 189 and the long arm of said lever having mounted in the extremity thereof an antifriction-roller 190. Connected to one of the side pieces of the casing and adapted to rotate therewith is a cam 191, said cam being adjacent to the lower surface of the shaft 155. Each valve has a flattened surface, as clearly shown in Fig. 13, the flattened surface of valve 170 being indicated by the numeral 192 and the flattened surface of valve 177 by the numeral 193. At diametrically-opposite points of the casing are provided recesses 194 194', and in these recesses are fitted and hinged gates 195 195', said gates being advisably in the form of bell-crank levers, with the inner portions of said levers extending through openings 196 196', respectively, provided therefor in the casing. Projecting out from the casing are housings 197 197', which form hoods or covers for the gates. Gate 195 is mounted on a rock-shaft 198, to the outer end of which is connected a crank-arm 199, and gate 195' is mounted on a rock-shaft 200, to the outer end of which is connected a crank-arm 201. The crank-arm 199 and 201 are connected by means of a link 202, which is preferably composed of two parts connected by means of a turnbuckle 203, whereby the link may be adjusted. In Fig. 11 of the drawings the link 202 is shown in dotted lines. It will be understood that the section of Fig. 11 is such that this link would not appear in said figure, as it would be in front of the side which is removed in said figure. For convenience, however, I have represented the link in the figure referred to by dotted lines, so as to make the connections perfectly plain. The operation of this form of the engine is as follows: Steam passes through the inlet-pipe 166, thence into chamber 161, thence into valve-chamber 162, thence through port 165 into chamber 157. In Fig. 13 of the drawings the duct 178 of valve 177 is shown in register with the passage 168′, while the duct 171 of valve 170 is shown as out of register with passage 168. When, therefore, the casing has revolved sufficiently far to cause the cam 191 to act on the antifriction-roller 190, which is in contact therewith, the lever 188 is turned so as to throw the foot 189 upwardly, and thereby uncover the duct 178 and permit the steam from the chamber 157 to pass through said duct and through the passage 168′ and into the chamber 167 and act on the gates 195 and 195′, so as to cause the rotation of the casing. The exhaust-steam in the other portion of the chamber 167 between the gates is free to flow through the passage 169, thence through the duct 172 into the chamber 158, thence through the port 204, thence through the longitudinal passage 159, and finally out of the exhaust-pipe 160. In order to reverse the engine, all that is necessary is to throw the lever 188 so that the antifriction-roller will not be in position to be contacted with by the cam 191 and to throw the lever 184 inward, so as to bring the antifriction-roller 186 into position to be contacted with by the cam 191. When this adjustment is made, it is obvious that a reversal of rotation of the engine will be secured. By means of the link connection 202 as one gate is moved inward the other gate is forced outwardly, as will be obvious.

Sheet 7 of the drawings also illustrates a form of engine in which the piston is stationary and the outer casing rotatable. The outer rotatable casing is indicated by the numeral 205, and from this casing radiate a series of spokes 206, which connect with an outer rim 207. The numeral 408 indicates a piston which at one portion abuts against the inner rim of the casing. This piston is mounted fast on or integral with a stationary shaft 209, and in this shaft is formed a longitudinal passage 210, from which leads an exhaust-pipe 211. The shaft is also formed with a chamber 212, and this chamber communicates with a valve-chamber 213, said valve-chamber having a valve 214 therein. This valve is provided with an opening or a series of openings, and from its top extends a valve-rod 215, which projects through the top of the valve-chamber. Within the piston is formed a chamber 216, and this chamber is in communication with the valve-chamber by means of a port 217. Chamber 216 is in communication with a passage 218 in the shaft. The shaft has also extending therefrom a passage 219, which passage is continued for a distance in the piston, as indicated by the numeral 220, and at its outer end connects with a passage 221 at right angles thereto, said passage 221 extending in opposite directions and connected at opposite ends with annular recesses 222 222′, formed in the outer surface of opposite sides of the piston. These recesses 222 and 222′, respectively, are in communication with recesses 223 223′ in the inner faces of the side pieces of the casing. Within the longitudinal passage 210 of the shaft is a rotatable valve 224, said valve provided with a circular recess 225 in its outer surface and also with a duct 226, leading to its interior or bore. The valve is operated by means of a valve-rod 227, which extends out through the end of the shaft and is provided with suitable means (not shown) for operating it. A spring 228 surrounds the valve-rod and is confined between the end of the shaft and a collar mounted on said rod. This spring serves to keep the valve forced inwardly in proper position. Opposite sides of the outer surface of the piston are also provided with recesses 229 229′. The inner surfaces of the sides of the casing are also provided with recesses similar to 230, (and corresponding to the recesses 223 223′,) and these recesses 230 extend directly to the recesses 229 229′. Connecting these two recesses 229 and 229′ is a transverse passage 231, (similar to passage 221,) and from this passage 231 extends another passage 232, said passage 232 joining another passage 233, extending through the shaft 209 and to the bore thereof. The inlet-pipe leading to the chamber 212 is indicated by the numeral 234. The chamber between the piston and the casing is indicated by the numeral 235. The piston is provided at diametrically-opposite points with gate-recesses 236 and 236′, in which are fitted and hinged gates 237 237′, said gates being preferably in the form of bell-cranks and hinged, respectively, on rods 238 238′. These rods are connected by means of a link 239, which extends into a recess provided therefor in the shaft 209. The outer portions of the gates work through openings 240 240′, respectively, provided therefor in the piston. In the operation of this form of the engine the steam is free to flow through the inlet-pipe 234, thence into the chamber 212, thence into the valve-chamber 213, thence through the port 217 into chamber 216 of the piston, thence through passage 218, thence around recess 225 of the valve 224, thence along registering passages 219 and 220, thence along passage 221 into the recesses 222 and 222′, thence around recesses 223 223′ into the portion of the chamber 235, where it acts upon the gates in order to cause a rotation of the casing. The exhaust-steam in the other portion of the chamber 235 is free to flow through the recesses 230, thence into recesses 229 and 229′, thence along passage 231, thence through the registering passages 232 and 233, thence through the port 226 of the valve 224, thence through the bore of said valve into passage 210 of the shaft, and thence finally out through the exhaust-pipe 211. In order to reverse the engine, all that is necessary to be done is to turn the rod 227 so as to rotate valve 224 and cause the passage 225 thereof to connect the passages 218 and 233, the port 226 at the same time being brought into register with the passage 219. The course of the inlet-steam and the course of the exhaust-steam will then be exactly opposite to that just described.

While in the foregoing description of the several forms of my engine I have described steam as the actuating medium, yet it will be understood that any other desirable and suitable actuating agent may be employed without departing from the spirit and scope of my invention.

The generic feature of my invention, which is common to the several forms of engine illustrated, consists of a casing forming an interior casing-chamber, a piston within said chamber and having a bearing contact at one portion against the casing, said piston provided with communicating chambers and also with ports leading to the casing-chamber, one of the parts referred to being rotatable, and segmental recesses formed in the inner faces of the opposite side pieces of the casing, said recesses being in communication with each other through the communicating chambers of the piston and said recesses being closed by the ends of the piston, and the ports of the piston adapted to be brought into register with said recesses at certain periods of the rotation of the rotatable part, whereby the inlet-steam is free to pass from one segmental recess through the communicating chambers of the piston into the other segmental recess, and thence into the casing-chamber, an inlet-pipe for conducting the steam to one of said segmental recesses, movable gates adapted to be moved outwardly and inwardly, and when moved outwardly to intersect the casing-chamber and to be acted upon by the inlet-steam in said chamber, and means for exhausting the steam from the space in said chamber confined by the sides of the gates opposite to the sides which the inlet-steam acts on.

What I claim as my invention is—

1. In a rotary engine, the combination, with a casing, a piston therein and having a bearing contact at one point against the casing, a chamber being formed between the piston and the casing, and one of the parts referred to being rotatable, hinged gates adapted to be turned in or out, and when turned outwardly adapted to intersect the casing-chamber, a link connecting the gates so that when one gate is turned inwardly, the other is turned outwardly and vice versa, means for introducing steam into the casing-chamber so as to act against the gates and cause a rotation of the rotatable part, and means for exhausting the steam from the chamber.

2. In a rotary engine, the combination, of a casing, a piston therein and having a bearing contact at one portion with the casing, a chamber being formed between the piston and the casing, said piston provided with communicating-chambers and also with ports leading to the casing-chamber, one of the parts referred to being rotatable, segmental recesses formed in the inner faces of the opposite side pieces of the casing, said recesses being in communication with each other through the communicating chambers of the piston, and said recesses being closed by the ends of the piston, and the ports of the piston adapted to be brought into register with said recesses at certain periods of the rotation of the rotatable part, whereby the steam is free to pass into the casing-chamber, an inlet-pipe for conducting the steam to one of said segmental recesses, movable gates adapted to be moved outwardly and inwardly, and when moved outwardly to intersect the casing-chamber and to be acted upon by the inlet-steam in said chamber, and means for exhausting the steam from the space in said chamber confined by the sides of the gates opposite to the sides which the inlet-steam acts on.

3. In a rotary engine, the combination, of a casing, a piston therein and having a bearing contact at one portion against the casing, a chamber being formed between the piston and the casing, and one of the parts referred to being rotatable, a two-part shaft on which the piston is mounted, hinged gates adapted to be turned in and out, and when turned outwardly adapted to intersect the casing-chamber, a link connecting the hinged points of the gates so that when one gate is turned inwardly the other is turned outwardly, and vice versa, said link extending across the interior of the piston and between the inner non-meeting ends of the two-part shaft, means for introducing steam into the chamber so as to act against the gates and cause a rotation of the rotatable part, and means for exhausting the steam from the chamber.

4. In a rotary engine, the combination, of a casing, a piston therein and having a bearing contact at one portion against the casing, a chamber being formed between the piston and the casing, and one of the parts referred to being rotatable, hinged gates adapted to be turned in or out, and when turned outwardly adapted to intersect the chamber, an adjustable link connecting the two gates, means for introducing steam into the chamber so as to act against the gates and cause a rotation of the rotatable part, and means for exhausting the steam from the chamber.

In testimony whereof I affix my signature in presence of two witnesses.

JOHN P. DORAN.

Witnesses:
S. H. BARNARD,
J. S. SAYLES.